Oct. 18, 1927.
G. GRAFFINBERGER
1,645,751
VALVE
Filed Nov. 20, 1924
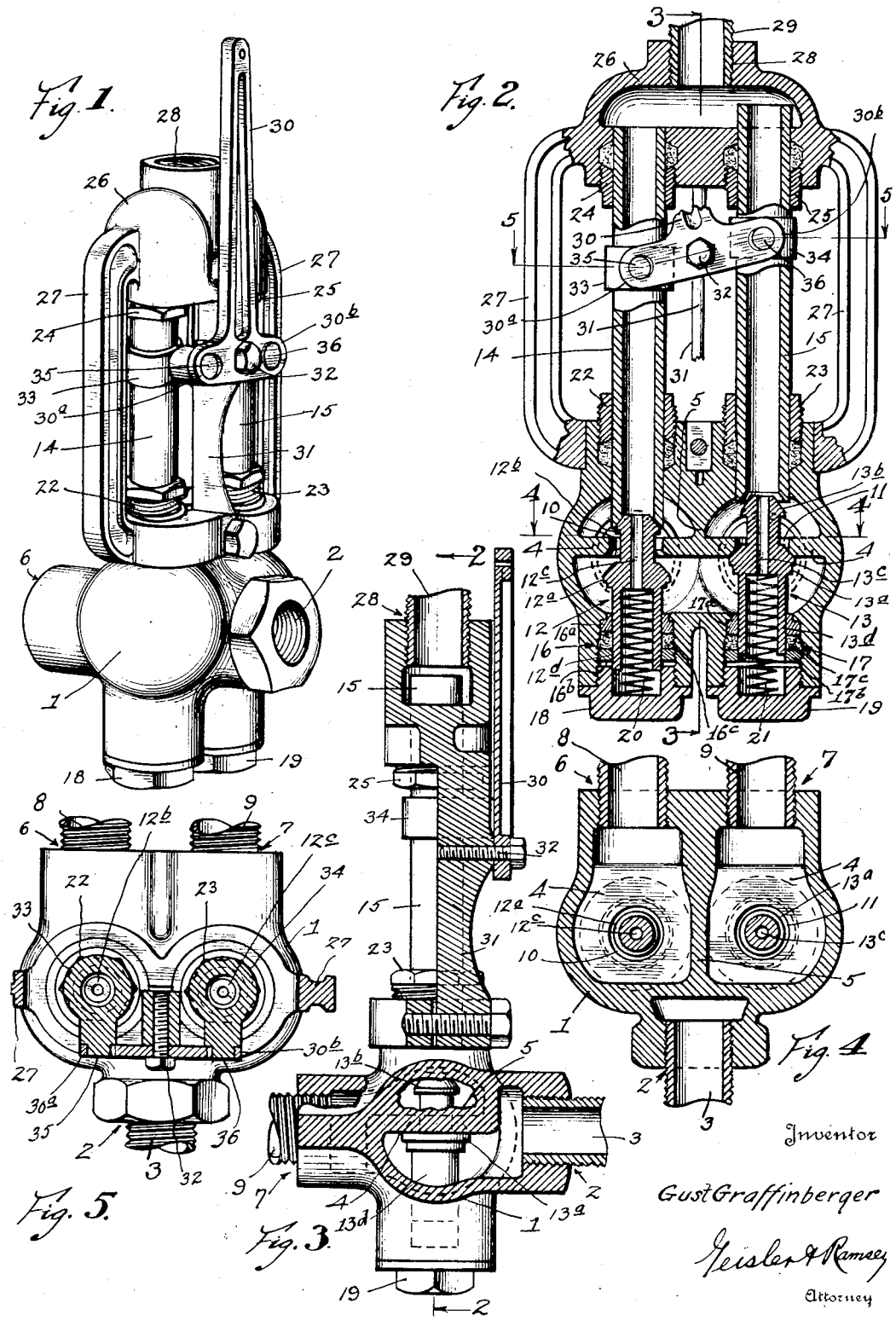
Inventor
Gust Graffinberger
Geisler & Ramsey
Attorney Patented Oct. 18, 1927.

1,645,751

UNITED STATES PATENT OFFICE.

GUST GRAFFINBERGER, OF PORTLAND, OREGON.

VALVE.

Application filed November 20, 1924. Serial No. 751,053.

My invention has for its object the providing of an efficient, yet simple valve mechanism for controlling the admission and emission of the actuating fluid, to and from, both ends of a double-acting cylinder, such, for example, as invented by me to be used in connection with trimmer saw mechanism, and illustrated and described by my application for patent entitled Trimmer saw mechanism, filed February 1, 1923, Serial No. 616,322, to which application reference is hereby had since my present application in part is a division and continuation with respect to the particular valve mechanism described in my said prior application.

As stated in my said co-pending application, in order to control properly the action of a double acting cylinder element to be used in trimmer saw mechanisms, it is desirable that each end of the cylinder be controlled by a separate valve unit, and preferably of the type invented by me and described in my co-pending application for Letters Patent entitled Valves filed September 18, 1922, Serial No. 588,964, and to which application reference is also hereby had, since my present invention in part is a continuation of the latter application. And it is further necessary that the two valve units, controlling the opposite ends of the cylinder, respectively, function properly and in unison.

I have discovered that when the piston of a cylinder whose opposite ends are controlled by separate valve mechanism of the type described, is suddenly moved towards one end of the cylinder by the admission of the actuating fluid into its opposite end, the fluid at the emitting side of the piston tends to build up undue excess pressure momentarily, and said excess pressure tends to unseat the valve-unit controlling the emitting end of the cylinder, thereby admitting the operating fluid at both ends of the cylinder simultaneously, which renders the valve control inoperative for the instant and results in the stalling of the piston in midposition, and prevents its proper movement.

Therefore, one of the particular objects of my invention is to provide a valve mechanism not affected by said variance of pressures in the cylinder which it controls.

I attain this object by providing a duct connecting both sides of the valve but not communicating with the inlet side of the valve. I further provide means for controlling such duct; that is to say, covering or closing the duct to prevent the passage therethrough of the actuating fluid, or uncovering and opening the same to permit such passage in synchronism with the operations of the valve.

In short, the duct permits the excess pressure of the emitted actuating fluid to be transmitted to both sides of the valve, thus neutralizing the effect of such excess pressure, and preventing the partial opening of the valve during the period it should remain closed.

A further particular object of my invention is to provide a quick acting valve especially adapted for use with trimmer saw mechanism, and similar devices, thereby positively and quickly to move the saw towards and from the work.

I attain the latter object by balancing the valve with respect to the pressure of the actuating fluid, so that the valve may be unseated by the expenditure of but little effort, which is important since in trimmer saw mechanism a gang of valves has to be manually controlled.

More particularly describing this feature of my invention, as embodied in my said improved valve: I attain the latter object by eliminating any excess cross sectional area on the inlet side of the valve. To this end I provide the valve with a stem having fluid tight reciprocation in a guide-socket located in, but having no communication with, the inlet side of the valve housing, and I make the cross section of the valve of such proportion as to leave only a narrow margin of the valve disc projecting beyond the periphery of its stem.

A further object of my invention is to provide a valve mechanism of the character described which is of compact form and conveniently manufactured and installed.

I attain this object by housing the two units of my valve mechanism in a common body which is provided with a transverse partition dividing the same into inlet and outlet sides; the housing having a common inlet for both valve units, but the outlet side of said chamber is sub-divided by a wall into two independent chambers, each provided with an outlet port controlled by a manually reciprocable exhaust pipe which operates one of the valve units. And I further provide means for operating said discharge pipes, and thereby both valve units, synchronously but oppositely; such means may consist of an operating lever fulcrumed between, and connected to, the said respective exhaust pipes.

The details of construction and mode of operation of my invention I have hereinafter described with reference to the accompanying drawings.

In said drawings:

Fig. 1 is a perspective view of my improved double acting valve with the control lever controlling the associated two units thereof set in neutral position;

Fig. 2 is a longitudinal section of my valve taken substantially on the line 2—2 of Fig. 3, in this figure, however, the connecting lever of the valve units is shown in full;

Fig. 3 is a longitudinal section taken on the line 3—3 of Fig. 2, with portions of the valve housing broken away to disclose structural details;

Fig. 4 is a transverse section taken on the line 4—4 of Fig. 2; and

Fig. 5 is a transverse section taken on the line 5—5 of Fig. 2;

My valve mechanism is made up of a valve body 1 which is preferably an integral casting which houses the valve mechanism for both valve units. It is provided with an inlet port 2 common to both units, the actuating fluid being passed to this inlet port through the conduit 3. The valve body is divided transversely by a Z-shaped transverse partition 4 which extends across both valve units enclosed within said body While my invention is illustrated as applied to two co-operative valve units, such application merely illustrates the use of my invention in connection with the compression cylinder of a trimmer saw; but as obvious each valve unit completely embodies my invention.

The portion of the spring valve units above the transverse partition 4 are separated by a vertical partition 5. Below said transverse partition, however, there is no vertical partition and the actuating steam admitted through the inlet port 2 can pass with equal facility to either of the valve units. The outlet ports 6 and 7 are arranged in the valve body so as to communicate with the portion of the valve body above the partition 4 which is the inlet side. The actuating fluid which enters through the inlet port 2 is thus controlled by the valve mechanism and is directed thereby to either the outlet conduit 8 in the port 6, or the outlet conduit 9 in the port 7.

I provide ports 10 and 11 in the partition 4 through which the actuating fluid passes through the respective outlet chambers to the outlet ports 6 and 7, respectively, as can be noted in Fig. 3. Said ports 10 and 11 are in substantial alinement with the inlet port 2 and the outlet ports 6 and 7 and are substantially equal in cross sectional area therewith. It is also to be noted that the inlet conduit 3 and the respective outlet conduits 8 and 9 are in substantial alinement so that the actuating fluid moving through the valve is subjected to a minimum resistance to flow. The valve members 12 and 13 control the flow of fluid through the outlet ports 10 and 11 respectively. Said valve members each carry two discs, the main valve discs 12$^a$ and 13$^a$ respectively and the auxiliary valve disc 12$^b$ and 13$^b$ respectively. Said valve members are provided with longitudinal ducts or vents 12$^c$ and 13$^c$, respectively, and are provided with chambered valve stems 12$^d$ and 13$^d$, respectively.

The main valve discs 12$^a$ and 13$^a$ are adapted to close respectively, the ports 10 and 11 in the partition 4. The auxiliary valve discs 12$^b$ and 13$^b$ respectively open and close the bores of the reciprocal exhaust pipes 14 and 15, respectively, and engage the seats 14$^a$ and 15$^a$ formed on the lower end of the latter. The hollow valve stems 12$^d$ and 13$^d$ reciprocate in fluid tight guide sockets 16 and 17, respectively, which are enclosed respectively by the removable caps 18 and 19, respectively. The said fluid tight guide socket 16 comprises two packing nuts 16$^a$ and 16$^b$ which clamp packing material 16$^c$ between them, and said guide socket 17 comprises two similar packing nuts 17$^a$ and 17$^b$ which grip packing 17$^c$ between them. The bores of said nuts correspond closely to the outside diameter of the hollow valve stem so that said bores constitute guides for said stems. All of said packing nuts are threaded in the valve body and the packing can be compressed by turning one of said nuts relatively to the other. Access can be had to said packing and said packing nuts by removing the caps 18 or 19. Coil springs 20 and 21 respectively are placed within the hollow valve stems 12$^d$ and 13$^d$ and bear, at one end thereof bearing up, against the valve members 12 and 13 respectively, and at the other end bearing down on the caps 18 and 19 respectively. Said coil springs 20 and 21 tend to hold the main valve discs 12$^a$ and 13$^a$ seated against the ports 10 and 11 respectively so as to close the latter; and I found it convenient to provide a place for said springs by hollowing said valve stems, and cupping said caps 18, 19.

The reciprocal exhaust pipes 14 and 15 are slidably mounted in packing members 22 and 23 respectively in the housing 1 at their lower ends. At their upper ends they are slidably mounted in packing members 24 and 25 in the exhaust head 26 which is carried by the brackets 27. Said exhaust head is common to both valve units and the auxiliary outlet port 28 is adapted to receive the common auxiliary exhaust conduit 29 through which the actuating fluid is directed away from both valve units.

The packing members 16ᶜ and 17ᶜ, 22 and 23, 24 and 25, are all provided not only to prevent the loss of actuating fluid, but also in cases where the actuating fluid is compressed air to prevent the freezing of the slidable exhaust pipe in place. In all valve structures of this type, with which I am familiar leakage of compressed air in smaller quantities from the valve structure causes the moisture content to form ice about said small leaks, and as said leaks are usually between a movable part and a fixed part, the ice so formed causes the movable part to be frozen to the fixed part to prevent their being moved until said ice is thawed. The cause of ice forming when the temperature approaches within ten to twenty degrees of freezing is that the compressed air is supplied to the valve under a relatively high pressure and assumes atmospheric temperature in the reservoir, and thus when the pressure is suddenly removed the resultant drop in temerature causes the moisture content to be frozen. I have discovered that if small leaks are absolutely prevented in valves of this character that the movable parts of the valve will not tend to be frozen in place, because the main exhaust ports are of such size that the reduction in pressure is not so sudden.

I mount an operating lever 30 upon a rib 31 lying substantially parallel to the reciprocal exhaust pipes 14 and 15, said control lever being mounted upon a pivot 32 substantially equi-distant from each of said two pipes. At convenient places I preferably form integral rings 33 and 34 on the slidable exhaust pipes 14 and 15, respectively, said rings being provided with oustanding pins 35 and 36, respectively. The operating lever 30 is provided with outstanding ears 30ᵃ and 30ᵇ which are journalled on said pins 35 and 36 and thus when said operating lever 30 is rocked above its pivot 32, it reciprocates said pipes 14 and 15, relatively in the valve body 1. Said operating lever 30 being pivoted at a point between and substantially equi-distant from said exhaust pipes 14 and 15, thus moves said pipes oppositely relatively to each other, and gives each the same distance of travel.

The operation of my valve is as follows: When the operating lever 30 is in its neutral position as shown in Fig. 1, the seats 14ᵃ and 15ᵃ on the lower ends of the reciprocal exhaust pipes 14 and 15 seat upon the auxiliary valve discs 12ᵇ and 13ᵇ, respectively, but yet with not such force as to move the main valve discs 12ᵃ and 13ᵃ from their seats so as to uncover the ports 10 and 11. If the operating lever is rocked counter clockwise as viewed in Fig. 2, it will cause the exhaust pipe 14 to be depressed and the exhaust pipe 15 to be lifted. The depression of the exhaust pipe 14 causes the main valve disc 12ᵃ to be unseated from the port 10 and thus permit actuating fluid to pass through the latter port and into the cylinder through the conduit 9. At the same time the lifting of the exhaust pipe 15 unseats its lower end 15ᵃ from the auxiliary valve disc 13ᵇ and thus permits the actuating fluid to pass from the cylinder through conduit 9 and into said exhaust pipe 15 and out through the auxiliary conduit 29 to the atmosphere. Thus, if the outlet conduit 9 where connected with the upper end of the actuating cylinder and the outlet conduit 8 were connected to the lower end, the movement of the valve in this manner would cause actuating fluid to be admitted to the upper end of said cylinder to drive the piston downwardly in said cylinder and would simultaneously permit the emission of the actuating fluid from the lower end to permit the piston to be so driven. As hereinbefore brought out, the longitudinal ducts 12ᶜ and 13ᶜ in the valve members, respectively, permit the actuating fluid to pass into the guide sockets 16 and 17 under the valve members 12 and 13, respectively, to aid the coil springs 20 and 21 in holding the valve discs against their seats. In the position which the valve member 13 is shown in Fig. 2, the outrush of actuating fluid emitted from the cylinder to the chamber above the partition 4 might exceed the pressure of the actuating fluid from the source of supply, below said partition and such unbalanced pressure would tend to unseat the valve disc 13ᵃ and permit the actuating fluid to be admitted at both ends of the cylinder simultaneously and thus cause the operator to lose control of the movement of the piston. In mechanism which must be quickly moved from one position to another, such for example as a hill nigger or trimmer saw mechanism of saw mills, this momentary loss of control destroys that absolute timing of the movement of the piston which is essential. I have also discovered that the provision of the longitudinal ducts 12ᶜ and 13ᶜ through the disks of the valves eliminates the tendency of a surge of actuating fluid to disturb the seating of the valve discs. A further favorable result of said longitudinal ducts is that it permits the valves to be opened more easily because the pressure at both sides of the valve member can be equalized which thus eliminates the jerky action caused by the sudden release of a pressure bound valve disc.

I claim:

1. In a valve of the character described, a valve body having an inlet and an outlet and formed with a guide socket located in but having no communication with the inlet side of the valve chamber, a valve disc provided with a stem having fluid tight bearing in said guide socket, and a manually operable exhaust-pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said guide socket being provided with a vent not communicating with said inlet side, thereby to prevent compression being set up in said guide socket tending to throw the valve out of balance.

2. In a valve of the character described, a valve body having an inlet and an outlet and formed with a guide socket located in but having no communication with the inlet side of the valve chamber, a valve disc provided with a stem having fluid tight bearing in said guide socket, and a manually operable exhaust-pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said valve disc provided with a longitudinal pressure balancing duct connecting said guide socket with the outlet side of the valve chamber and with said exhaust-pipe when the latter is seated on the valve disc.

3. In a valve of the character described, a valve body having an inlet and on outlet and formed with a guide socket located in but having no communication with the inlet side of the valve chamber, a valve disc provided with a stem having fluid tight bearing in said guide socket, said stem having a cross section leaving only a narrow margin of the valve disc projecting beyond the periphery of the said valve stem, a manually operable exhaust-pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said guide socket being provided with a vent not communicating with said inlet side, thereby to prevent compression being set up in said guide socket tending to throw the valve out of balance.

4. In a valve of the character described, a valve body having an inlet and an outlet and formed with a guide socket located in but having no communication with the inlet side of the valve chamber, a valve disc provided with a stem having fluid tight bearing in said guide socket, a coil spring located in said guide socket normally seating the valve and a manually operable exhaust-pipe reciprocable in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said guide socket being provided with a vent not communicating with said inlet side, thereby to prevent compression being set up in said guide socket tending to throw the valve out of balance.

5. In a valve of the character described, a valve body having an inlet and an outlet and formed with a guide socket located in but having no communication with the inlet side of the valve chamber, a valve disc provided with a chambered stem having fluid tight bearing in said guide socket, a coil spring located in said guide socket and bearing in the chamber of said valve stem normally seating the valve, and a manually operable exhaust-pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said guide socket being provided with a vent not communicating with said inlet side, thereby to prevent compression being set up in said guide socket tending to throw the valve out of balance.

6. In a valve of the character described, a valve body having an inlet and an outlet and formed with a guide socket located in but having no communication with the inlet side of the valve chamber, a valve disc provided with a chambered stem having fluid tight bearing in said guide socket, said stem having a cross section leaving only a narrow margin of the valve disc projecting beyond the periphery of the said valve stem, a coil spring located in said guide socket and bearing in the chamber of said valve stem normally seating the valve, and a manually operable exhaust pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said valve disc provided with a longitudinal pressure balancing duct connecting said guide socket with the outlet side of the valve chamber and with said exhaust pipe when the latter is seated on the valve disc.

7. A valve control mechanism for a power cylinder of the character described, comprising a valve unit for each end of the cylinder, each of said units including a valve disk provided with a stem having fluid tight bearing in a guide socket located in, but having no communication with the inlet side of the valve chamber, an exhaust-pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said valve disc having longitudinal duct connecting said guide socket with the outlet side of the valve chamber and said exhaust-pipe when the latter is seated on the valve and means for operating said exhaust-pipes of both valve units synchronously but oppositely, whereby any momentarily excess pressure in the emitting end of the power cylinder due to the sudden movement of the cylinder piston and tending to unbalance the valve, is neutralized by pressure distribution to both ends of the valve.

8. A valve control mechanism for a power cylinder of the character described, comprising a valve unit for each end of the cylinder, each of said units including a valve disc provided with a stem having fluid tight bearing in a guide socket located in, but having no communication with the inlet side of the valve chamber, and exhaust-pipe reciprocal in the outlet side of the valve body in axial alinement with said valve disc, controlling the escape of the operating fluid, said exhaust-pipe constituting the operating member of said valve disc, one end thereof seating on said valve disc and its opposite end extending to the outside of the valve body, said valve disc having longitudinal duct connecting said guide socket with the outlet side of the valve chamber and said exhaust-pipe when the latter is seated on the valve, and an operating lever connected to the exhaust-pipes of both valve units, and fulcrumed to operate said exhaust-pipes and thereby said valve discs synchronously, but oppositely, whereby any momentarily excess pressure in the emitting end of the power cylinder due to the sudden movement of the cylinder piston and tending to unbalance the valve, is neutralized by pressure distribution to both ends of the valve.

9. A valve mechanism of the character described comprising a valve body provided with a chamber divided by a transverse partition into inlet and outlet sides, the inlet side being provided with a common inlet, the outlet side being sub-divided by a partition into two independent chambers, the first mentioned partition being provided with two ports opening into said independent chambers of said outlet side respectively, valve discs seating on the inlet side of said ports respectively, an exhaust-pipe reciprocal in the outlet side of the valve body of each of said independent outlet chambers, and in axial alinement with said valve discs respectively, said exhaust pipes controlling the escape of the actuating fluid, and constituting the respective operating members of said valve discs, one of the ends of said exhaust-pipes seating on the related valve disc, the opposite end thereof extending to the outside of the valve body, and means for operating said exhaust-pipes and thereby said valves synchronously but oppositely.

GUST GRAFFINBERGER.